Patented May 16, 1944

2,348,780

UNITED STATES PATENT OFFICE 2,348,780

PROCESS OF IMPROVING CATALYSTS

David G. Blaker, Webb City, and Maryan P. Matuszak, Bartlesville, Okla., assignors to Phillips Petroleum Company, a corporation of Delaware No Drawing. Application April 8, 1940, Serial No. 328,594

7 Claims. (Cl. 252—236)

This invention relates to a process of improving catalysts and more particularly to improving granular catalysts of the alumina type. It also relates to the use of an improved catalyst for the treatment of hydrocarbons.

Catalysts of the alumina type are comprised substantially of aluminum oxide. They may consist of or be derived from any of the several readily distinguishable materials that contain alumina as the chief component, as for example, commercial aluminas such as those used for drying purposes, synthetic aluminas prepared by precipitation and/or ignition methods, and aluminas prepared from naturally occurring aluminum minerals such as bauxite, gibbsite, and diaspore. These materials either possess a porous structure advantageous for catalytic purposes or acquire such a porous structure upon being dehydrated by heating to elevated temperatures. Of these materials, bauxite is the most abundant and the most economical source of substantially pure alumina; therefore from it is prepared the form of alumina preferred for many catalytic purposes. Nevertheless, in so far as this invention is concerned, other forms of alumina generally may be used instead of bauxite, but usually at higher cost, as, for example, aluminas prepared by proper ignition, calcination, or other suitable treatment of aluminum hydroxide or of aluminum salts of oxygen-containing acids such as the carbonate, nitrate, sulfate, and the like, including those found as natural minerals or ores.

Catalysts of the alumina type are useful for promoting a number of chemical reactions, especially those requiring elevated temperatures. Among these are desulfurization of hydrocarbons, reforming and/or cyclicization of hydrocarbons, cracking of petroleum to gasoline, and dehydrogenation of hydrocarbons. Processes utilizing these reactions are of great commercial importance at the present time because they are very useful in the manufacture or in the improvement of motor fuel. Desulfurization with the aid of alumina-type catalysts such as bauxite, as disclosed in the Buell and Schulze Patent No. 2,016,271, effects the transformation of organically combined sulfur to hydrogen sulfide, which is readily removable by well-known means, such as a caustic alkali wash. Reforming of motor-fuel hydrocarbons consists substantially in the dehydrogenation and/or the isomerization of hydrocarbons of low anti-knock value to hydrocarbons of higher antiknock value. Dehydrogenation of motor-fuel hydrocarbons, by itself, produces similarly an increase in the anti-knock value, or octane rating, of the motor fuel. Dehydrogenation is of major interest today because it is a method of converting gaseous paraffin hydrocarbons to gaseous olefin hydrocarbons that can be polymerized into normally liquid hydrocarbons that have important advantages as motor fuels, lubricating oils, and special hydrocarbons of high molecular weight, or that can be utilized for the manufacture of many other products such as alcohols, halogenated hydrocarbons, resins, and the like.

The highly selective catalytic dehydrogenation action of the alumina formed by dehydration of a hard bauxite (the bauxite mined at Bauxite, Arkansas, hereinafter described) is indicated by the data of the following tabulation, which gives typical analyses of the effluents obtained when paraffin gases were passed separately at atmospheric pressure over the alumina-type catalyst derived from such bauxite by dehydration in air at temperatures up to about 600° C. (1112° F.). The gases were passed at the rate of 1000 volumes, measured at 0° C. (32° F.) and 760 mm. Hg, per volume of catalyst per hour, and the temperature of dehydrogenation was from 570 to 625° C. (1058 to 1157° F.).

*Typical analyses of products of dehydrogenation*

[Per cent by volume]

| Original gas | Isobutane | | Normal butane | | Propane | |
|---|---|---|---|---|---|---|
| Hydrogen | 20.0 | 31.3 | 12.2 | 19.3 | 14.3 | 26.6 |
| Methane | 2.9 | 4.1 | 1.2 | 2.3 | 1.5 | 3.7 |
| Ethylene | 0.2 | 0.4 | 0.7 | 1.3 | 0.6 | 1.3 |
| Ethane | 0.0 | 0.1 | 0.4 | 0.7 | 0.0 | 0.0 |
| Propylene | 1.5 | 2.2 | 0.4 | 1.4 | 11.3 | 18.0 |
| Propane | 0.0 | 0.1 | 0.1 | 0.2 | 72.3 | 50.4 |
| Butylenes | 15.8 | 21.4 | 9.0 | 12.9 | ---- | ---- |
| Butane | 59.1 | 40.0 | 75.5 | 61.3 | ---- | ---- |
| Heavier | 0.5 | 0.4 | 0.5 | 0.6 | ---- | ---- |
| | 100.0 | 100.0 | 100.0 | 100.0 | 100.0 | 100.0 |

These data indicate that the alumina derived by dehydration of bauxite has an exceptionally high catalytic dehydrogenation activity under the stated operating conditions and produces a relatively clean-cut and consequently advantageous dehydrogenation of paraffin hydrocarbons to the corresponding olefin hydrocarbons.

We have found that by washing a granular alumina-type catalyst, or the equivalent granular aluminiferous material that yields the alumina-type catalyst upon proper ignition or calcination, as with water under conditions that will be more fully disclosed hereinafter, there is produced an unexpected increase in the activity and catalytic life of the catalyst. Whether or not this increase in catalytic life is due totally to removal of adherent minute particles is not definitely known by us; conceivably, the improvement we have found may be due partly to some chemical or physical influence of the water upon the atoms comprising the surface of the catalyst granules. Hence, any theoretical explanation offered herein should not be construed as limiting the scope of our invention.

We have found that hard bauxite when treated by our process yields exceptional and superior alumina-type catalysts for the treatment or conversion of hydrocarbons, such as desulfurization, reforming, and dehydrogenation of hydrocarbons. In the form in which it is found in nature, such bauxite is relatively hard and upon being crushed, there are formed granules that are relatively free from objectionable disintegration into powder by abrasion during handling.

In the preparation of an alumina-type catalyst from a material such as hard bauxite, in accordance with our invention, the bauxite generally first is crushed or broken into granules, the size of which is substantially the same as that for the final catalyst. The granules may be of any suitable size, but a size of from 4 to 20 mesh is preferred. The granular bauxite is dehydrated at an elevated temperature before being used as a catalyst. Our invention comprises washing such granules with a stream of water, either before or after such dehydration, or other high-temperature treatment. A washing period of from 10 to 20 minutes is generally long enough; we have observed no change in the degree of improvement by leaching or washing of bauxite with distilled water for periods as long as 20 hours beyond the point at which the wash water appears quite clear and thus indicates that minute dust particles have been removed. The water used may be ordinary tap water or distilled water; however, long-continued washing with tap water, but not with distilled water, such as for periods in excess of about an hour, may cause a change in the catalytic properties of the final material, presumably because of adsorption of dissolved minerals from such tap water, and therefore long-continued washing with mineral-containing water is excluded specifically from our present invention. The water used may be cold or hot; no change in the degree of improvement has been observed for the use of boiling water instead of water at room temperature. Addition of a trace of an acid, such as hydrochloric acid, does not appear to affect the efficacy of the wash water. However, our process should not be confused with leaching processes intended to effect chemical changes with the aid of a substantial concentration of an acid or the like. We prefer that, during the washing, definite agitation of the granules should be realized.

A concept that has been accepted generally heretofore is that the catalytic productivity or the catalytic life of a given amount of a contact mass, when used under such conditions that it effects a given degree of conversion, increases with increase in the degree of subdivision of the mass. This concept is based on the fact that, as a body is subdivided more and more finely, its aggregate surface area is correspondingly increased. Although this concept may be true for many solid catalysts in general, we have found that it apparently is not completely true for catalysts of the alumina type, at least when they are used for promoting the reactions mentioned hereinbefore.

The minute or dust-like particles mentioned herein either are present as such originally or are disengaged to a large extent when the aluminiferous material is crushed or broken to the desired granular size. Some may also be formed by abrasion of the granules against each other in subsequent handling. They probably consist substantially of the same material as the desired granules. Because of their smallness, they adhere so tenaciously to the granules that they are not removed by screening or sieving operations nor to a large extent even by blowing with air. They appear to exert a deleterious catalytic effect, perhaps by clogging pores in the catalyst granules. It appears that the beneficial results of our washing treatment come about because of the removal of these minute dust particles, for the initial water used for washing such materials becomes cloudy with fine suspended particles, and the general appearance of the untreated granules is that of a dull, dusty material that is in marked contrast to the harsh, sharp and clean appearance of granules of material which have been treated in accordance with our invention. However, we have as yet no definite proof that such removal is the direct or only cause of the beneficial results we obtain, and we do not wish to be limited by the theories presented.

It is an object of our invention to provide a process for the improvement of the catalytic properties of hard granular alumina-type catalytic materials which are substantially chemically inert to liquid water.

It is a further object of our invention to provide a process for freeing granules of hard granular alumina-type catalytic materials from objectionably fine particles by washing such granules with a liquid stream.

It is a further object of our invention to provide a process for subjecting a hard, coherent granular aluminiferous material, which is substantially chemically inert to water, to treatment with a flowing stream of water to improve its catalytic properties.

Another object of our invention is to provide an improved granular alumina-type catalyst suitable for the dehydrogenation of hydrocarbons.

Still another object of our invention is to provide an improved granular catalytic material comprising alumina and prepared from naturally-occurring aluminiferous materials.

A still further object of our invention is to provide a process for the treatment of a hard bauxite by washing granules thereof with water.

Further objects and advantages of our invention are apparent from the disclosure contained herein.

The invention comprises a process for the improvement of granular alumina-type catalysts by washing them with a flowing liquid in such a manner that dust or minute particles, which so adhere to the granules that they are not removed by the use of sieves or screens, are substantially removed.

In one specific embodiment the process of the invention comprises washing granular aluminiferous material to remove adherent minute particles prior to the ignition or calcination in which the substantially anhydrous granular alumina-type catalyst is formed from the original aluminiferous material.

In a preferred embodiment the process of the invention comprises washing a granular alumina-type catalyst in such a manner that removal of adherent minute particles or dust is effected subsequent to the initial ignition or calcination in which the substantially anhydrous granular alumina-type catalyst is formed from an original granular aluminiferous material, said removal being followed by a second ignition or a drying step prior to or simultaneous with the beginning of a period of use of the catalyst.

For the sake of simplicity, but not for the sake of limiting our invention, we shall confine our detailed description of the process of our invention primarily to bauxite, which is a natural aluminiferous material that upon dehyration yields a preferred alumina-type catalyst. It is to be understood that substantially the same process may be applied to other natural materials such as gibbsite, diaspore, and the like.

The principal sources of bauxite in the United States are in Arkansas and Alabama. Such samples of Alabama bauxite as we have examined have been found soft and powdery, and while such material may be good as a source of aluminum, it is somewhat too soft and powdery for ordinary catalytic use, and we prefer to use a harder bauxite, such as is found in certain sections of Arkansas. It is realized that large deposits of bauxite are found in other parts of the world, such as in South America and Europe, and it is not intended that these should be disclaimed if they are otherwise suitable. The classification of a particular mass of bauxite as to "hard" or "soft" is of course pretty much one of degree, but nevertheless one which is readily determined and ascertained. We choose to define a bauxite as being hard, when it may be readily handled without an undue or deleterious amount of mechanical disintegration of the individual particles or of the production or sloughing off of excessive amounts of fine material, known to the art as "fines."

A particularly desirable bauxite is found in nature as hard pebbles, or chunks embedded in a bed of much softer material that apparently is a siliceous clay. In the mining of this bauxite, the pebbles sometimes are freed roughly or superficially from the siliceous clay by washing with water. In consequence of this washing, the bauxite sometimes is called "washer product" bauxite. At the present time we know of only one locality, the region around Bauxite, Arkansas, in which this particular bauxite is mined in the manner just described; however, such bauxite is doubtless to be found in other localities.

The washing involved in the mining of this particular bauxite, which has for its purpose the isolation of the hard pieces of bauxite, clearly is different from, and not to be confused with, the washing involved in our invention, which has for its purpose the improvement of the catalytic properties of the alumina-type, granular catalyst formed from bauxite. Whereas the washing involved in the mining of this particular bauxite is a process incidental and obvious in view of its purpose, the washing involved in our invention is one that is unprecedented and non-obvious in producing superior results that are unexpected and unknown in the prior art pertaining to alumina-type catalysts.

In one embodiment of our invention, an aluminiferous material such as hard bauxite, after being crushed and screened to the desired granular size, is placed in a washing vessel, and water is injected at the lower end of the vessel at a rate sufficient to agitate the granules and to free them from adherent minute particles in a relatively short time; the used wash water with its content of dislodged particles is discharged from the upper part of the vessel. Continuous methods of washing such material with a flowing stream of water may also be employed, such as by placing the catalyst granules on a sieving belt or screen, and passing them through a body of water or past a jet or spray of water. Other means of accomplishing the washing and agitation in a desired manner will be obvious to those skilled in the art. For example, a mechanical agitator positioned in a body or stream of water may be used to agitate the particles, advantageously if water is scarce or if it cannot be supplied economically at a rate high enough to cause sufficient agitation. Other fluids than water may be used, providing that they do not leave behind catalyst poisons upon vaporization or do not otherwise poison or impair the catalyst. Water will most generally be used, as it is readily available and inexpensive, but the suitability of other fluids can readily be determined by trial by one skilled in the art.

At some stage of its preparation, the catalysts should be subjected to a high-temperature treatment, whereby volatile material, such as water of hydration or carbon dioxide from carbonates, is removed. This treatment per se, for the catalysts which are improved by the treatment of our invention, is old in the art. Inasmuch as it is necessary to dry the catalyst particles after our treatment, our treatment may readily be performed before such high-temperature treatment, whereby the high-temperature treatment and the drying treatment are accomplished simultaneously. However, we have found that our washing treatment is even more effective if it is applied after the high-temperature treatment of the prior art, being followed by a separate and additional drying or high-temperature treatment, so that in many cases the advantage to be gained by first subjecting a material such as bauxite granules to a high-temperature treatment, following this by washing the treated granules with water in accordance with our disclosure, and then again drying the treated granules, is such as more than to compensate for the added expense of the additional step. The temperature of the high-temperature treatment is not critical and may reach as high as 800° C. (1472° F.) withut producing any apparent deleterious effects; a temperature range for dehydration of from about 300° C. (572° F.) to about 600° C. (1112° F.) is preferred. The time of dehydration also is not critical; most of the water is removed by the time the temperature of the bauxite reaches 500° C. (932° F.), and exposure to a temperature of 600° C .(1112° F.) over a wide range of heating periods, such as the range 1 to 24 hours, produces no detectable change in catalytic properties. Similarly, the atmosphere in which the granular bauxite is dehydrated is not critical; dehydrations in air, in hydrogen, and in nitrogen produce alumina-type catalysts of apparently identical catalytic efficiency.

The following specific examples are given to illustrate and bring out more clearly the advantages to be gained from the practice of our invention.

*Example I*

A portion of hard bauxite was crushed and screened to 10 to 40-mesh size. The granules were washed first with tap water until they were free from visible dust, followed by washing for a short time with distilled water; then they were dehydrated by being heated gradually to 600° C. (1112° F.) in a stream of air and being kept at that temperature for 20 hours. After being cooled, a measured portion of the granules was heated to about 590° C. (1094° F.) in hydrogen and used for the dehydrogenation of isobutane at atmospheric pressure, at a space velocity of 1000 volumes (NTP) of isobutane per volume of catalyst per hour, and under temperature conditions so controlled automatically that the conversion to isobutene was maintained substantially constant at 17 per cent. The length of the run to the point at which the temperature of the catalyst reached 625° C. (1157° F.) was 39 hours. The minimum temperature during the run was 575° C. (1067° F.). A portion of the same batch of bauxite granules, when treated in identically the same manner except that the washing with water was omitted, gave a run of only 22 hours for the dehydrogenation of isobutane under the same conditions, and the minimum temperature during the run was 590° C. (1094° F.). Thus, for the same extent of conversion, the sample of granular bauxite treated in accordance with our invention had a higher catalytic activity, as is indicated by a minimum temperature lower by 15° C. (27° F.), and a longer catalytic life, as is indicated by a running time longer by 17 hours or by 77%, than the sample that was not so treated.

After revivification by removal of carbonaceous deposits with air at a temperature that was raised gradually from 300 to 600° C. (572 to 1112° F.), each of the two samples, when used again for the dehydrogenation of isobutane, practically repeated its performance of the runs just described. The improvement effected in the catalyst by our treatment therefore is permanent and is unaffected by revivification. Such revivification with air at elevated temperatures can be repeated indefinitely without decreasing the improvement effected by our invention.

*Example II*

"Washer product" bauxite procured from Bauxite, Arkansas, and mined as hereinbefore discussed, in the form of granules of 10 to 40-mesh size was treated as in Example I except that the dehydration after the removal of minute particles by washing with tap water and distilled water was made in a stream of hydrogen and at a final temperature of 625° C. (1157° F.). When used under the conditions given in Example I, the treated material effected constant conversion of 17% of isobutane to isobutene for 40 hours (up to an end temperature of 625° C. (1157° F.)) instead of the 22 hours characteristic of the bauxite of the same batch but not treated in accordance with our invention. The minimum temperature during the run was 570° C. (1058° F.) instead of that of 590° C. (1094° F.) observed for the untreated bauxite.

*Example III*

Another portion of the same bauxite was treated and used exactly as in Example I except that the temperature during the dehydrogenation run was so controlled automatically that the conversion of isobutane to isobutene was maintained substantially constant at 20% instead of 17%. The initial temperature of the run was about 600° C. (1112° F.). The length of the run up to a final temperature of 625° C. (1157° F.) was 20 hours, and the minimum temperature was 584° C. (1083° F.). Under the same conditions, a portion of the same batch of bauxite granules that were treated in the same way, except that the washing step of our invention was omitted, gave a run of only 15 hours, and the minimum temperature of the run was from 598° C. (1108° F.). Thus, the bauxite treated in accordance with our invention produced an alumina-type catalyst that effected 33% more dehydrogenation than the same bauxite not so treated.

*Example IV*

A hard bauxite of a batch different from that used in the preceding examples was treated and used exactly as in Example I, except that the granules were merely heated to 590° C. (1094° F.) in hydrogen instead of also being kept at 600° C. (1112° F.) for 20 hours prior to use, effected conversion of 17% of isobutane to isobutene for 34 hours before the temperature reached 625° C. (1157° F.); the minimum temperature was 570° C. (1058° F.). Under the same conditions, a portion of the same batch of bauxite that was not treated in accordance with the washing step of our invention gave a run of only 26 hours, and the minimum temperature was 580° C. (1076° F.).

In a preferred embodiment of our invention, the washing step is carried out after the original aluminiferous material has been converted to an alumina-type catalyst by proper ignition or calcination. As previously mentioned, we have found that, for example, washing the granules of the material formed by dehydration of bauxite at an elevated temperature yields an improved catalyst that is even superior to that obtained when the washing is effected before the dehydration. In other words, washing after dehydration effects an improvement in addition to that effected by washing before dehydration. Furthermore, the washing before dehydration effects no improvement that is not effected equally well by washing after dehydration. Hence, we prefer to use a single washing step that is made after the dehydration of the bauxite. However, the use of two washing steps, one before and one after calcination of an aluminiferous material, is not to be excluded from the scope of our invention.

Although the reason for the increased improvement effected by the washing after dehydration is not known definitely, it appears to be due to a disengagement, during the dehydration, of minute catalytically inert or catalytically deleterious particles, perhaps from pores that previously were closed or clogged, that then can be removed by the washing.

*Example V*

A sample of the dehydrated bauxite of Example I that had been washed in accordance with our invention prior to dehydration and that was capable of effecting a conversion of 17 per cent of isobutane to isobutylene for about 40 hours under the conditions stated therein was revivified with air after use. It was then washed again with distilled water until the wash water appeared to be free from entrained minute particles, or for about 15 minutes. It was then dried at 600° C. (1112° F.) for 20 hours and used again for the dehydrogenation of isobutane. The run, at a constant conversion of 17% and to a final temperature of 625° C. (1157° F.), lasted for 55 hours, which is a period longer by 15 hours or by 38%, than that obtained for the portion of the same batch of bauxite that was used in Example I and that was washed only before dehydration and by 33 hours or by 150% than that obtained for the portion of the same batch of bauxite that was not treated at all in accordance with our invention.

Example VI

Bauxite, such as was used in Example III, was crushed and screened to 10 to 40-mesh size, and dehydrated by being heated gradually in air to about 600° C. (1112° F.) and kept at this temperature for 20 hours. Then it was washed with water as hereinbefore described until the wash water was free from visible entrained particles and dried again in air at 600° C. (1112° F.) for 20 hours. On being used for the dehydrogenation of isobutane at atmospheric pressure and at a space velocity of 1000 volumes (NTP) per volume of catalyst per hour, it effected a constant conversion of 20% to isobutene for 26 hours before the temperature reached 625° C. (1157° F.); the minimum temperature was 575° C. (1067° F.). As was shown by Example III, a portion of the same batch of bauxite that was washed only before dehydration effected the same extent of conversion for 20 hours, and a portion of the same batch of bauxite that was totally untreated in accordance with our invention effected the same conversion for only 15 hours. The improvement effected by the washing after dehydration was thus greater by 120% than that effected by the washing before dehydration. The improved catalyst of this example effected 73% more dehydrogenation, at 20% conversion of isobutane to isobutene and to a final temperature of 625° C. (1157° F.), than did the catalyst from the same batch of bauxite that was not improved by the process of our invention.

Example VII

A portion of the same batch of bauxite granules that were used in Example VI was washed with water until no more minute particles were entrained in the wash water, then was dehydrated by being heated in air to 600° C. (1112° F.) and kept at this temperature for 20 hours, then was washed again until the wash water was again free from minute particles, and finally was dried in air at 600° C. (1112° F.) for 20 hours. When used for the dehydrogenation of isobutane at atmospheric pressure and at a space velocity of 1000 volumes (NTP) per volume of catalyst per hour, the resulting improved catalyst effected conversion of 20 per cent of isobutane into isobutene for 24 hours before the catalyst temperature reached 625° C. (1157° F.). The performance of the catalyst was practically identical with that of the improved catalyst of Example VI, thus indicating that the additional preliminary washing step prior to the initial dehydration did not produce an improvement that would not have been effected by a single washing after the dehydration.

We can cite many other specific examples showing the improvement effected by the practice of our invention and showing that variations in details of procedure, such as in the length of the washing period after removal of minute particles or dust, in the length of the initial dehydration period and/or subsequent drying period, in the atmosphere used during dehydration and/or drying, in the temperature of the water, and in the addition of an acid to the wash water, are without apparent effect upon the improvement. However, such additional examples are not given because they would lengthen the description of our invention unduly and because the examples given are believed to be sufficient as clear illustrations of some of the possible modes of operation of our invention.

In the interests of simplicity and brevity, we have limited the detailed description of our invention and our specific examples to particular materials and to particular conditions of treatment. This detailed description and these specific examples are given solely for illustrative purposes and not as in any sense limiting our invention. Other materials and conditions are comprised in many modifications other than those specifically illustrated and will be obvious to those skilled in the art. Therefore, our invention is not to be limited to any particular aluminiferous material nor to the use of catalysts improved by our process for the effecting of any particular reaction or of any particular treatment of hydrocarbons; but it is to be understood to be as extensive in scope and equivalents, within the scope of appended claims, as the prior art allows.

We claim:

1. A process for the improvement of the catalytic activity of a catalytic material which consists essentially of alumina that is in the form of granules of substantially uniform size, which granules are of suitable size for use as a catalyst, and which granules have dust particles that are not removable by screening adhering thereto, which comprises washing said catalytic material with such an amount of water and for such period that adherent dust particles are substantially completely removed therefrom.

2. A process for the improvement of the catalytic activity of a catalytic material which consists essentially of alumina that is in the form of granules of substantially uniform size and which granules are not substantially larger than 4-mesh nor substantially smaller than 20-mesh, and which material is substantially free from fines that are removabe by screening but which granules have dust particles that are not removable by screening adhering thereto, which comprises washing said granulated catalytic material with such an amount of water and for such period that adherent dust particles are substantially completely removed therefrom.

3. A process for the improvement of the catalytic activity of a catalytic material which consists essentially of bauxite that is in the form of granules of substantially uniform size and which granules are not substantially larger than 4-mesh nor substantially smaller than 20-mesh, and which material is substantially free from fines that are removable by screening but which granules have dust particles that are not removable by screening adhering thereto, which comprises washing said granulated bauxite material with such an amount of water and for such period that adherent dust particles are substantially completely removed therefrom.

4. A process for the improvement of the catalytic activity of a catalytic material which consists essentially of alumina that is in the form of granules of substantially uniform size, which granules are of suitable size for use as a catalyst, and which granules have dust particles that are not removable by screening adhering thereto, which comprises calcining said granulated catalytic material to effect dehydration thereof, and thereafter washing said calcined granulated material with such an amount of water and for such period that adherent dust particles are substantially completely removed therefrom.

5. A process for the improvement of the catalytic activity of a catalytic material which consists essentially of bauxite that is in the form of granules of substantially uniform size and which granules are not substantially larger than 4-mesh nor substantially smaller than 20-mesh, and which material is substantially free from fines that are removable by screening but which granules have dust particles that are not removable by screening adhering thereto, which comprises calcining said granulated bauxite material to effect dehydration thereof, and thereafter washing said calcined granulated bauxite material with such an amount of water and for such period that adherent dust particles are substantially completely removed therefrom.

6. A process for the preparation of a catalytic material which consists essentially of alumina granules, which comprises granulating an alumina material and removing therefrom the granules that are substantially larger than a size suitable for use as a catalyst and removing therefrom the granules and loose fines which are substantially smaller than a size suitable for use as a catalyst, thereafter calcining said graded granules of alumina material, thereafter washing said calcined granules of alumina material, which still have dust particles that are not removable by screening adhering thereto, with such an amount of water and for such period that adherent dust particles are substantially completely removed therefrom, and thereafter drying the washed granules.

7. A process for the preparation of a catalytic material which consists essentially of bauxite granules, which comprises granulating a bauxite material and removing therefrom the granules that are substantially larger than a size suitable for use as a catalyst and removing therefrom the granules and loose fines which are substantially smaller than a size suitable for use as catalyst, thereafter calcining said graded granules of bauxite material, thereafter washing said calcined granules of bauxite material, which still have dust particles that are not removable by screening adhering thereto, with such an amount of water and for such period that adherent dust particles are substantially completely removed therefrom, and thereafter drying the washed granules.

DAVID G. BLAKER.
MARYAN P. MATUSZAK.